United States Patent
Tarui

(10) Patent No.: US 10,962,960 B2
(45) Date of Patent: Mar. 30, 2021

(54) CHIP REMOVAL APPARATUS AND INFORMATION PROCESSING APPARATUS

(71) Applicant: Fanuc Corporation, Yamanashi (JP)

(72) Inventor: Yoshihiko Tarui, Yamanshi (JP)

(73) Assignee: Fanuc Corporation, Yamanashi (JP)

( * ) Notice: Subject to any disclaimer, the term of this patent is extended or adjusted under 35 U.S.C. 154(b) by 134 days.

(21) Appl. No.: 16/227,220

(22) Filed: Dec. 20, 2018

(65) Prior Publication Data
US 2019/0196454 A1 Jun. 27, 2019

(30) Foreign Application Priority Data
Dec. 26, 2017 (JP) .............................. JP2017-249339

(51) Int. Cl.
G05B 19/418 (2006.01)
G06N 20/00 (2019.01)

(52) U.S. Cl.
CPC ........... *G05B 19/418* (2013.01); *G06N 20/00* (2019.01); *G05B 2219/35181* (2013.01)

(58) Field of Classification Search
None
See application file for complete search history.

(56) References Cited

U.S. PATENT DOCUMENTS

| 10,279,448 B2 | 5/2019 | Nakayama |
| 2001/0049846 A1 | 12/2001 | Guzzi et al. |
| 2016/0263745 A1 | 9/2016 | Shirahata |
| 2018/0267489 A1 | 9/2018 | Tango et al. |
| 2019/0196454 A1 | 6/2019 | Tarui |

FOREIGN PATENT DOCUMENTS

| DE | 102018010086 A1 | 6/2019 |
| JP | 0688788 A | 3/1994 |
| JP | 0759716 A | 3/1995 |
| JP | 2004503853 A | 2/2004 |
| JP | 2008287378 A | 11/2008 |
| JP | 2015217520 A | 12/2015 |
| JP | 2016-120589 A | 7/2016 |
| JP | 2016168661 A | 9/2016 |
| JP | 2018153872 A | 10/2018 |

OTHER PUBLICATIONS

Nagdeve, L., V. Chaturvedi, and J. Vimal, "Parametric optimization of abrasive water jet machining using Taguchi methodology", Int'l J. Research in Engineering and Applied Sciences, vol. 2, issue 6, Jun. 2012, pp. 23-32. (Year: 2012).*

(Continued)

*Primary Examiner* — Vincent Gonzales
(74) *Attorney, Agent, or Firm* — RatnerPrestia

(57) ABSTRACT

Provided is an information processing apparatus which determines a discharge condition for a chip removal apparatus which discharges an object in order to remove chips, wherein the information processing apparatus observes data indicating a removal efficiency of the chips as a state variable representing a current state of an environment, acquires label data indicating the discharge condition, and learns the state variable and the label data in association with each other.

6 Claims, 6 Drawing Sheets

(56) References Cited

OTHER PUBLICATIONS

Somashekhar, K. P., N. Ramachandran, and Jose Mathew, "Optimization of material removal rate in micro-EDM using artificial neural network and genetic algorithms", Materials and Manufacturing Processes, 25.6, 2010, pp. 467-475. (Year: 2010).*

Kim, DH, et. al. "Smart machining process using machine learning: A review and perspective on machining industry", Int'l J. of Precision Engineering and Manufacturing—Green Technology, vol. 5, No. 4, pp. 555-568, 2018. (Year: 2018).*

Hormozi, E. et al., "Using of machine learning into cloud environment (a survey): managing and scheduling of resources in cloud systems", 2012 7th Int'l Conf. on P2P, Parallel, Grid, Cloud, and Internet Computing, IEEE, pp. 363-368. (Year: 2012).*

Japanese Decision to Grant a Patent for Japanese Application No. 2017-249339, dated Dec. 24, 2019, with translation, 5 pages.

\* cited by examiner

CHIP REMOVAL APPARATUS AND INFORMATION PROCESSING APPARATUS

CROSS-REFERENCE TO RELATED APPLICATION

This application is a new U.S. Patent Application that claims benefit of Japanese Patent Application No. 2017-249339 filed Dec. 26, 2017, the disclosure of this application is being incorporated herein by reference in its entirety for all purposes.

BACKGROUND OF THE INVENTION

1. Field of the Invention

The present invention relates to a chip removal apparatus and an information processing apparatus and, in particular, to a chip removal apparatus and an information processing apparatus capable of calculating an optimal cutting fluid discharge condition.

2. Description of the Related Art

In recent years, factory automation has advanced and a large number of products are now being manufactured by unmanned operations. Automation has also advanced in the field of machining, and the use of robots and the like for replacing workpieces enable unmanned operations to be performed for extended periods of time.

In such an automated machining system, means for automatically removing chips generated by machining from a machining area is necessary in order to prevent machining defects. Since chips are deposited at various positions, it is required that deposition positions of the chips are accurately specified to ensure efficient removal.

For example, Japanese Patent Application Laid-open No. 2016-120589 describes a technique for removing chips by providing an apparatus capable of moving relatively freely such as a robot with chip deposition situation detecting means such as a vision camera and chip removing means such as a cutting fluid nozzle and by discharging a cutting fluid to a chip deposition position detected by the chip deposition situation detecting means.

However, in the technique described in Japanese Patent Application Laid-open No. 2016-120589, a discharge condition (typically, a flow rate or the like) of the cutting fluid is not optimized. Therefore, depending on the deposition situation or the like of the chips, there is a problem in that more cutting fluid ends up being discharged than necessary, thereby placing a greater burden on machine elements such as a pump and a hose and consuming power and time required for removing the chips.

SUMMARY OF THE INVENTION

In consideration thereof, an object of the present invention is to provide a chip removal apparatus and an information processing apparatus capable of calculating an optimal cutting fluid discharge condition.

An information processing apparatus according to an embodiment of the present invention is an information processing apparatus which determines a discharge condition for a chip removal apparatus which discharges an object in order to remove chips, the information processing apparatus including: a state observing unit which observes data indicating a removal efficiency of the chips as a state variable representing a current state of an environment; a label data acquiring unit which acquires label data indicating the discharge condition; and a learning unit which learns the state variable and the label data in association with each other.

An information processing apparatus according to another embodiment of the present invention is an information processing apparatus which determines a discharge condition for a chip removal apparatus which discharges an object in order to remove chips, the information processing apparatus including: a state observing unit which observes data indicating a removal efficiency of the chips as a state variable representing a current state of an environment; a determination data acquiring unit which acquires determination data indicating a propriety determination result of the removal efficiency of the chips; and a learning unit which learns the discharge condition and the removal efficiency of the chips in association with each other using the state variable and the determination data.

The learning unit may include: a reward calculating unit which obtains a reward related to the propriety determination result; and a value function updating unit which updates, using the reward, a function representing a value of the discharge condition with respect to the removal efficiency of the chips.

The learning unit may calculate the state variable and the determination data in a multilayered structure.

The information processing apparatus may further include a decision making unit which outputs, based on a learning result by the learning unit, a command value based on the discharge condition.

The learning unit may learn the discharge condition using the state variable and the determination data obtained for each of a plurality of the chip removal apparatuses.

The information processing apparatus may exist on a cloud server.

A chip removal apparatus according to an embodiment of the present invention is a chip removal apparatus which discharges an object in order to remove chips, the chip removal apparatus including an information processing apparatus which determines a discharge condition. In addition, the information processing apparatus includes: a state observing unit which observes data indicating a removal efficiency of the chips as a state variable representing a current state of an environment; a label data acquiring unit which acquires label data indicating the discharge condition; and a learning unit which learns the state variable and the label data in association with each other.

A chip removal apparatus according to another embodiment of the present invention is a chip removal apparatus which discharges an object in order to remove chips, the chip removal apparatus including an information processing apparatus which determines a discharge condition. In addition, the information processing apparatus includes: a state observing unit which observes data indicating a removal efficiency of the chips as a state variable representing a current state of an environment; a determination data acquiring unit which acquires determination data indicating a propriety determination result of the removal efficiency of the chips; and a learning unit which learns the discharge condition and the removal efficiency of the chips in association with each other using the state variable and the determination data.

According to the present invention, a chip removal apparatus and an information processing apparatus capable of calculating an optimal cutting fluid discharge condition can be provided.

DETAILED DESCRIPTION OF THE PREFERRED EMBODIMENTS

Figure 1:
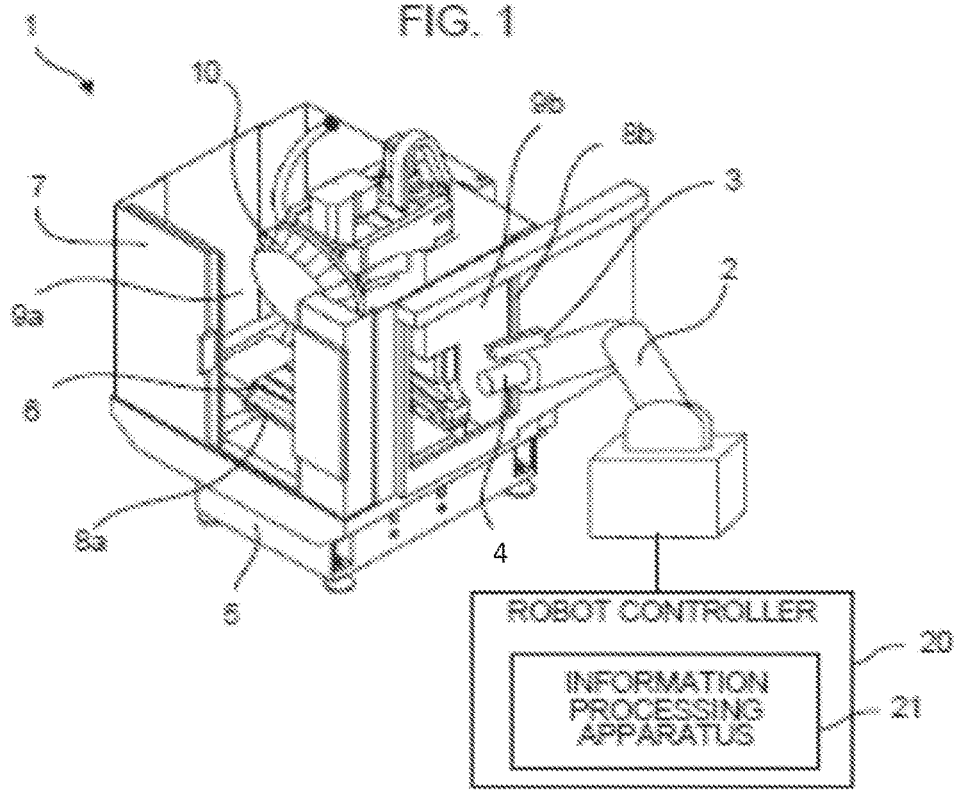
FIG. 1 is a diagram showing an example of a chip removal apparatus.

FIG. 1 is a diagram showing an example of a chip removal apparatus of a machine tool using a robot.

The chip removal apparatus is constituted by a machine tool 1, a robot 2 as a moving apparatus installed outside of the machine tool 1, a coolant gun 4 which is attached to the robot 2 and which discharges a cutting fluid or the like, a visual sensor 3 such as a vision camera attached to the robot 2, and an information processing apparatus 21 mounted to the robot 2.

In the machine tool 1, a splash guard 7 for cutting off an interior of the machine that is a machining space from the outside is provided on a bed 5 to prevent a cutting fluid or chips created by machining of a workpiece from scattering to the outside from the inside of the machine. The splash guard 7 is provided with openings 9a and 9b, and opening-closing doors 8a and 8b which are openable and closeable are respectively mounted to the openings 9a and 9b. A table 6 on which a workpiece (not shown) is to be place and a turret 10 which changes tools are arranged inside the machine. The machine tool 1 is controlled by a controller (not shown) to machine workpieces.

The robot 2 is a robot provided with a multi-jointed arm controlled by the robot controller 20, and the coolant gun 4 is attached to a tip of the arm. The robot controller 20 includes the information processing apparatus 21. Alternatively, the coolant gun 4 may be held by a hand attached to the tip of the arm of the robot.

During a period in which the machine tool 1 is not machining a workpiece, the robot 2 causes the tip of the arm to penetrate into the machine through the opening 9b, checks a deposition situation of chips by a detecting apparatus such as the visual sensor 3 attached to the robot 2, injects a cutting fluid used to machine a workpiece or, in other words, a coolant from the coolant gun 4 attached to the tip of the arm with respect to the deposited chips, cleans the chips deposited inside the machine, and discharges the chips to the outside of the machine. It should be noted that chip removal is not limited to the injection of a cutting fluid and a mode in which the chips are sucked together with a fluid such as air, a cutting fluid, or the like may be adopted.

The information processing apparatus 21 processes information related to a deposition situation of chips detected by the detecting apparatus such as the visual sensor 3 and performs a process of determining a location requiring removal of chips. The information processing apparatus 21 may be configured to be built into the robot controller 20 or may be configured independently from the robot controller 20. Since information processing related to a deposition situation of chips by the information processing apparatus 21 is concretely described in Japanese Patent Application Laid-open No. 2016-120589 described earlier and is well known, a detailed description will not be provided herein.

Figure 2:
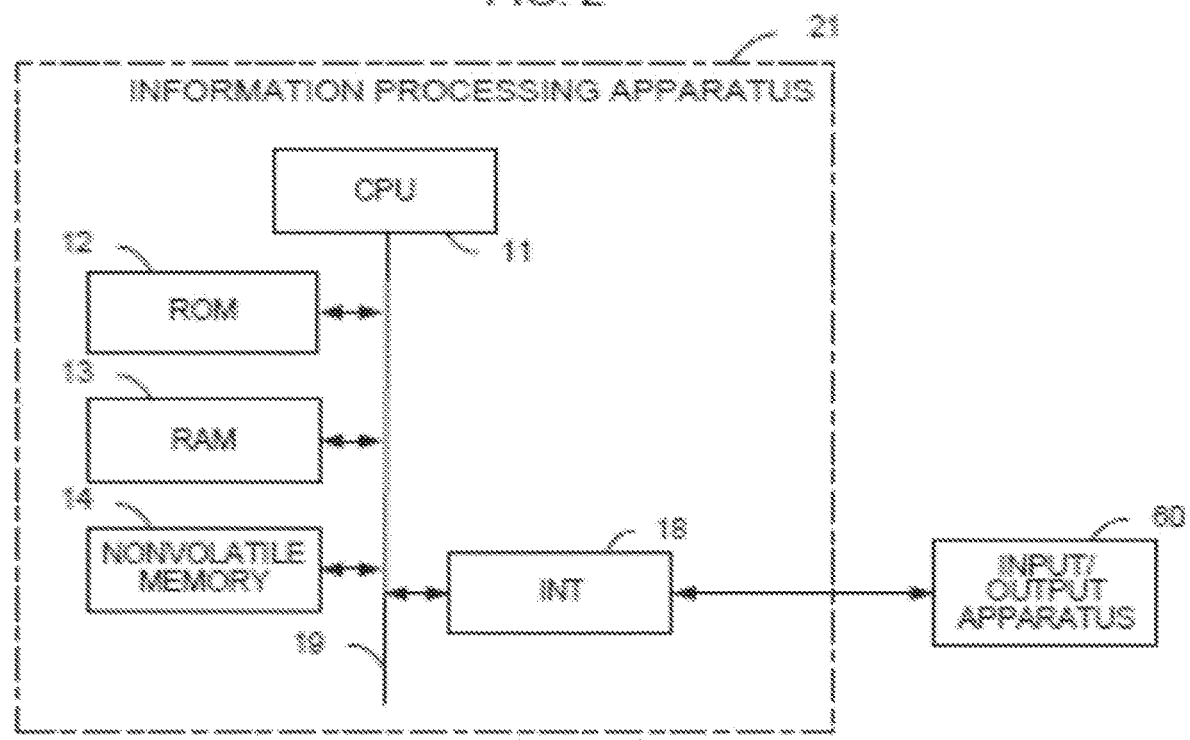
FIG. 2 is a schematic hardware configuration diagram of an information processing apparatus.

FIG. 2 is a schematic hardware configuration diagram showing substantial parts of the information processing apparatus 21 in the robot controller 20 shown in FIG. 1.

A CPU 11 provided in the information processing apparatus 21 is a processor which controls the entire information processing apparatus 21. The CPU 11 reads a program stored in a ROM 12 or a nonvolatile memory 14 via a bus 19, and controls the entire information processing apparatus 21 in accordance with the program. A RAM 13 temporarily stores calculation data, display data, and the like. In addition, the program and various data stored in the ROM 12 or the nonvolatile memory 14 may be deployed on the RAM 13 during execution or use.

An input/output apparatus 60 includes, for example, a display, a keyboard, and a communication interface, receives information from the CPU 11 via the interface 18 and display the information, and delivers various data input from the outside via the keyboard or wireless/wired communication to the CPU 11.

Figure 3:
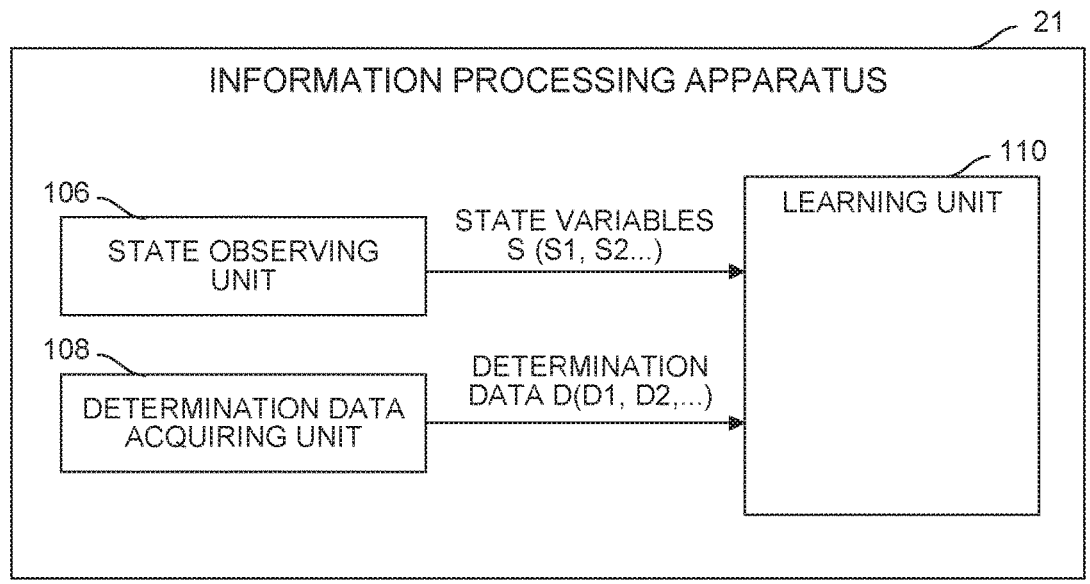
FIG. 3 is a schematic functional block diagram of an information processing apparatus according to an embodiment.

FIG. 3 is a schematic functional block diagram of the information processing apparatus 21 according to a first embodiment.

The information processing apparatus 21 includes software (such as a learning algorithm) and hardware (a processor (the CPU 11) or the like) for learning, by so-called machine learning, a discharge condition (a flow rate of a cutting fluid or the like, a pump output, or the like) with respect to a removal efficiency (a removal rate, a required time for removal, a required energy for removal, or the like) of chips. What the information processing apparatus 21 learns corresponds to a model structure representing a correlation between the removal efficiency of chips and the discharge condition.

As shown by functional blocks in FIG. 3, the information processing apparatus 21 is provided with a state observing unit 106, a determination data acquiring unit 108, and a learning unit 110. The state observing unit 106 observes state variables S representing a current state of an environment including data S1 indicating a removal efficiency (a removal rate, a required time for removal, a required energy for removal, or the like) of chips. The determination data acquiring unit 108 acquires determination data D including data D1 indicating a discharge condition (a flow rate of a cutting fluid or the like, a pump output, or the like). And the learning unit 110 learns the removal efficiency of chips and the discharge condition in association with each other using the state variable S and the determination data D.

For example, the state observing unit 106 may be configured as a function of the processor (the CPU 11) or may be configured as software which is stored in the ROM 12 and which enables the processor (the CPU 11) to function.

Among the state variables S observed by the state observing unit 106, the removal efficiency S1 of chips can be acquired by, for example, when performing cleaning of chips using the apparatus disclosed in Japanese Patent Application Laid-open No. 2016-120589, recording a ratio of an amount of chips before the cleaning to an amount of chips that remain after the cleaning (a removal rate), a cleaning time required to achieve a prescribed removal rate (a required time for removal), an amount of energy such as power required to achieve the prescribed removal rate (a required energy for removal), or the like.

In addition to the removal efficiency S1 of chips, the state observing unit 106 may include a deposition situation S2 of chips, a position and a direction S3 of the nozzle of the coolant gun 4, a shape S4 of the chips themselves, and the like in the state variables S. The deposition situation S2 of chips can be acquired as a distribution area of the chips obtained by the visual sensor 3 or a weight of the chips obtained by a weight sensor (not shown). For example, the interior of the machine that is a machining space may be divided into finite area numbers in advance, and for each area number, a distribution situation may be expressed by a plurality of levels such as level 1, level 2, . . . based on the distribution area or the weight. The position and direction S3 of the nozzle can be acquired as coordinates and a vector from the apparatus disclosed in Japanese Patent Application Laid-open No. 2016-120589. The shape S4 of the chips themselves can be acquired by the visual sensor 3. For example, a unique identification number maybe defined for each size, shape, or type of chips, and the defined identification number can be input as the shape S4 of the chips themselves.

For example, the determination data acquiring unit 108 may be configured as a function of the processor (the CPU 11) or may be configured as software which is stored in the ROM 12 and which enables the processor (the CPU 11) to function.

Among the determination data D acquired by the determination data acquiring unit 108, the discharge condition (a flow rate of a cutting fluid or the like, a pump output, or the like) D1 can be acquired by, for example, recording a flow rate of a discharged cutting fluid, a pump output, or the like when performing cleaning of chips using the apparatus disclosed in Japanese Patent Application Laid-open No. 2016-120589.

In addition to the discharge condition D1, the determination data acquiring unit 108 may include data D2 indicating a cross-sectional area or a cross-sectional shape of the nozzle in the determination data D.

For example, the learning unit 110 may be configured as a function of the processor (the CPU 11) or may be configured as software which is stored in the ROM 12 and which enables the processor (the CPU 11) to function. The learning unit 110 learns a correlation between the removal efficiency of chips and the discharge condition in accordance with arbitrary learning algorithms collectively referred to as machine learning. The learning unit 110 can iteratively execute learning based on a data set including the state variables S and the determination data D described earlier.

By repeating such a learning cycle, the learning unit 110 can automatically identify a feature that suggests a correlation between the removal efficiency of chips and the discharge condition. Although the correlation between the removal efficiency of chips and the discharge condition is substantially unknown at the start of the learning algorithm, the learning unit 110 gradually identifies a feature and interprets a correlation as learning progresses. Once the correlation between the removal efficiency of chips and the discharge condition is interpreted with a certain level of reliability, learning results iteratively output by the learning unit 110 can be used to perform a selection of action (in other words, decision making) as to how the discharge condition is to be determined with respect to a current state (in other words, the removal efficiency of chips). In other words, as the learning algorithm progresses, the learning unit 110 can make the correlation between the removal efficiency of chips and the action of how to determine the discharge condition gradually approximate an optimal solution.

As described above, in the information processing apparatus 21, the learning unit 110 learns, based on a machine learning algorithm, a correlation between the removal efficiency of chips and the discharge condition using the state variables S observed by the state observing unit 106 and the determination data D acquired by the determination data acquiring unit 108. The state variables S are constituted by data hardly affected by disturbance that is the removal efficiency of chips, and the determination data D is uniquely obtained by acquiring the discharge condition. Therefore, according to the information processing apparatus 21, using a learning result of the learning unit 110 enables the discharge condition corresponding to the removal efficiency of chips to be automatically and accurately obtained without having to rely on calculations and estimations.

When the discharge conditions can be automatically obtained without having to rely on calculations and estimations, since merely specifying the removal efficiency of chips enables a discharge condition corresponding to the removal efficiency to be promptly determined, the discharge condition can be determined in an efficient manner.

Figure 4:
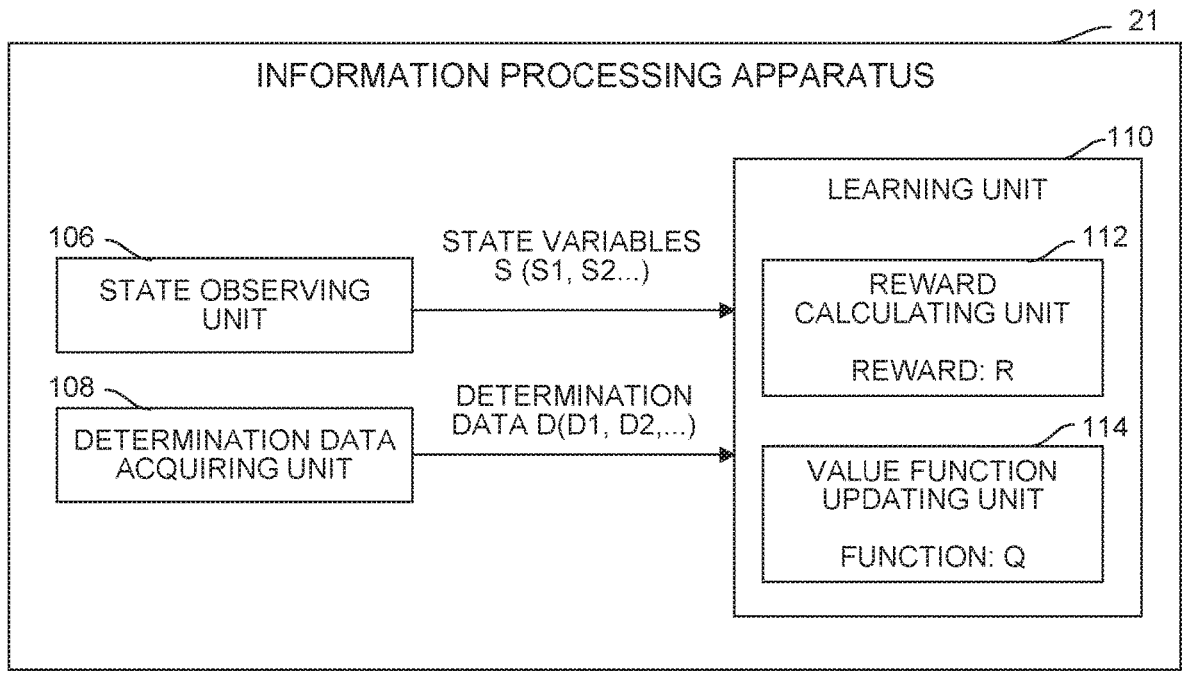
FIG. 4 is a schematic functional block diagram showing an aspect of an information processing apparatus.

In the information processing apparatus 21 configured as described above, the learning algorithm executed by the learning unit 110 is not particularly limited and learning algorithms known as machine learning can be adopted. FIG. 4 shows an aspect of the information processing apparatus 21 shown in FIG. 3 in which the information processing apparatus 21 is configured to include the learning unit 110 which executes reinforcement learning as an example of the learning algorithm.

Reinforcement learning is a method involving observing a current state (in other words, an input) of an environment in which a learning object exists and executing a prescribed action (in other words, an output) in the current state, iterating, by trial-and-error, cycles which provide some kind of reward to the action, and learning an action which maximizes a total reward (in the information processing apparatus 21 shown in FIG. 4, a discharge condition which maximizes the removal efficiency of chips) as an optimal solution.

In the information processing apparatus 21 shown in FIG. 4, the learning unit 110 is provided with a reward calculating unit 112 and a value function updating unit 114. The reward calculating unit 112 obtains a reward R related to a propriety determination result of a removal efficiency of chips in a case where the discharge condition is determined based on state variables S. And the value function updating unit 114 which updates a function Q representing a value of the discharge condition using the reward R. The learning unit 110 learns the discharge condition corresponding to the removal efficiency of chips as the value function updating unit 114 repetitively updates the function Q.

An example of an algorithm for reinforcement learning executed by the learning unit 110 will be described. The algorithm according to this example is known as Q-learning that is a method which uses a state s of a subject of action and an action a that the subject of action may select in the state s as independent variables to learn a function Q (s, a) that represents a value of the action a when selected in the state s. Selecting the action a which maximizes the value function Q in the state s provides an optimal solution. By starting Q-learning in a state where a correlation between the state s and the action a is unknown and repeating trial-and-error of selecting various actions a in an arbitrary state s, the value function Q is iteratively updated and approximated to the optimal solution. In this case, by adopting a configuration so that, when the environment (in other words, the state s) changes as a result of selecting the action a in the state s, a reward (in other words, a weight of the action a) r in accordance with the change is provided and guiding the learning so as to select the action a for which a higher reward r is provided, the value function Q can be approximated to the optimal solution in a relatively short period of time.

An update formula of the value function Q can be generally represented as expression (1) below. In expression (1), $s_{t+1}$ and $a_t$ respectively denote a state and an action at a time t, and the state changes to $s_{t+1}$ due to the action $a_t$. $r_{t+1}$ denotes a reward provided when the state changes from $s_t$ to $s_{t-1}$. The term of maxQ denotes Q when an action a is performed which (is considered at time t to) produce a maximum value Q at time t+1. $\alpha$ and $\gamma$ respectively denote a learning coefficient and a discount factor and are arbitrarily set within $0<\alpha\leq1$ and $0<\gamma\leq1$.

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

When the learning unit 110 executes Q-learning, the state variables S observed by the state observing unit 106 and the determination data D acquired by the determination data acquiring unit 108 correspond to the state s of the update formula, the action of how to determine the discharge condition corresponds to the action a of the update formula, and the reward R obtained by the reward calculating unit 112 corresponds to the reward r of the update formula. Therefore, the value function updating unit 114 repetitively updates the function Q representing a value of the discharge condition by Q-learning using the reward R.

For example, when a discharge condition is determined and removal of chips is subsequently performed based on the determined discharge condition, the reward R obtained by the reward calculating unit 112 can be a positive reward R when the removal efficiency of chips is determined as "appropriate" (for example, when the removal rate is high, when the required time for removal is short, or when the required energy for removal is low) and can be a negative reward R when the removal efficiency of chips is determined as "inappropriate" (for example, when the removal rate is low, when the required time for removal is long, or when the required energy for removal is high). Absolute values of positive and negative rewards R may be the same or may differ from each other. In addition, a determination may be made by using a combination of a plurality of values included in the determination data D as a determination condition.

The value function updating unit 114 can have an action value table in which the state variables S, the determination data D, and the reward R are organized in association with an action value (for example, a numerical value) represented by the function Q. In this case, an act of updating the function Q by the value function updating unit 114 is synonymous with an act of updating the action value table by the value function updating unit 114. Since the correlation between the current state of the environment and the discharge condition is unknown at the start of Q-learning, in the action value table, various state variables S, determination data D, and rewards R are prepared in a mode of being associated with randomly-determined values (the function Q) of the action value. The reward calculating unit 112 is capable of immediately calculating a corresponding reward R if determination data D is known, in which case the calculated value R is written into the action value table.

When Q-learning is advanced using a reward R that is provided for an action, learning is guided in a direction where an action having a higher reward R is selected, and the action value table is updated as a value (the function Q) of an action value with respect to an action performed in the current state is rewritten in accordance with a state (in other words, the state variables S and the determination data D) of the environment which changes as a result of performing the selected action in the current state. By repeating this update, the value (the function Q) of the action value displayed in the action value table is rewritten such that the more correct the action, the larger the value. In this manner, the previously-unknown correlation between the current state of the environment (the removal efficiency of chips) and an action (a discharge condition) corresponding thereto becomes gradually apparent. In other words, by updating the action value table, a relationship between the removal efficiency of chips and the discharge condition is gradually approximated to the optimal solution.

Figure 5:
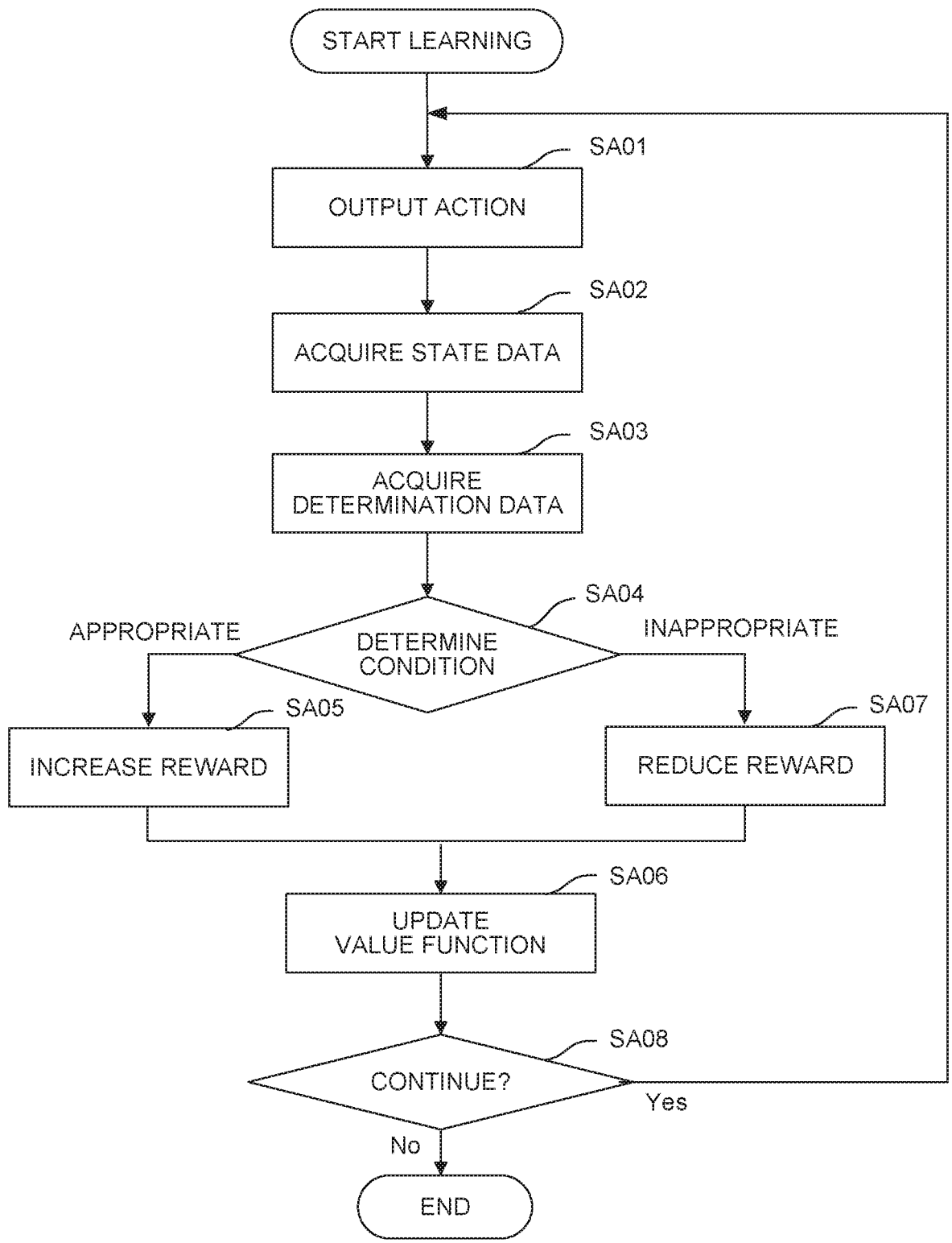
FIG. 5 is a schematic flowchart showing an aspect of a machine learning method executed by a learning unit in the information processing apparatus shown in FIG. 4.

With reference to FIG. 5, a flow of the Q-learning (in other words, a mode of a machine learning method) described above which is executed by the learning unit 110 in the information processing apparatus 21 shown in FIG. 4 will be further described.

First, in step SA01, the value function updating unit 114 refers to the action value table at that point to randomly select a discharge condition as an action to be performed in the current state indicated by the state variable S observed by the state observing unit 106. Next, in step SA02, the value function updating unit 114 captures the state variable S of the current state observed by the state observing unit 106 and, in step SA03, the value function updating unit 114 captures the determination data D of the current state acquired by the determination data acquiring unit 108. Subsequently, in step SA04, the value function updating unit 114 determines whether or not the discharge condition is appropriate based on the determination data D and, when appropriate, in step SA05, the value function updating unit 114 applies a positive reward R obtained by the reward calculating unit 112 to the update formula of the function Q and, in step SA06, updates the action value table using the state variable S and the determination data D in the current state, the reward R, and the value of the action value (the function Q after update). On the other hand, when the value function updating unit 114 determines that the discharge condition is not appropriate in step SA04, in step SA07, the value function updating unit 114 applies a negative reward R obtained by the reward calculating unit 112 to the update formula of the function Q and, in step SA06, updates the action value table using the state variable S and the determination data D in the current state, the reward R, and the value of the action value (the function Q after update). The learning unit 110 iteratively updates the action value table by repeating the processes of steps SA01 to SA07, and advances the learning of the discharge condition. Note that the process of obtaining the reward R and the update process of the value function in steps SA04 to SA07 are executed with respect to respective pieces of data included in the determination data D.

Figure 6:
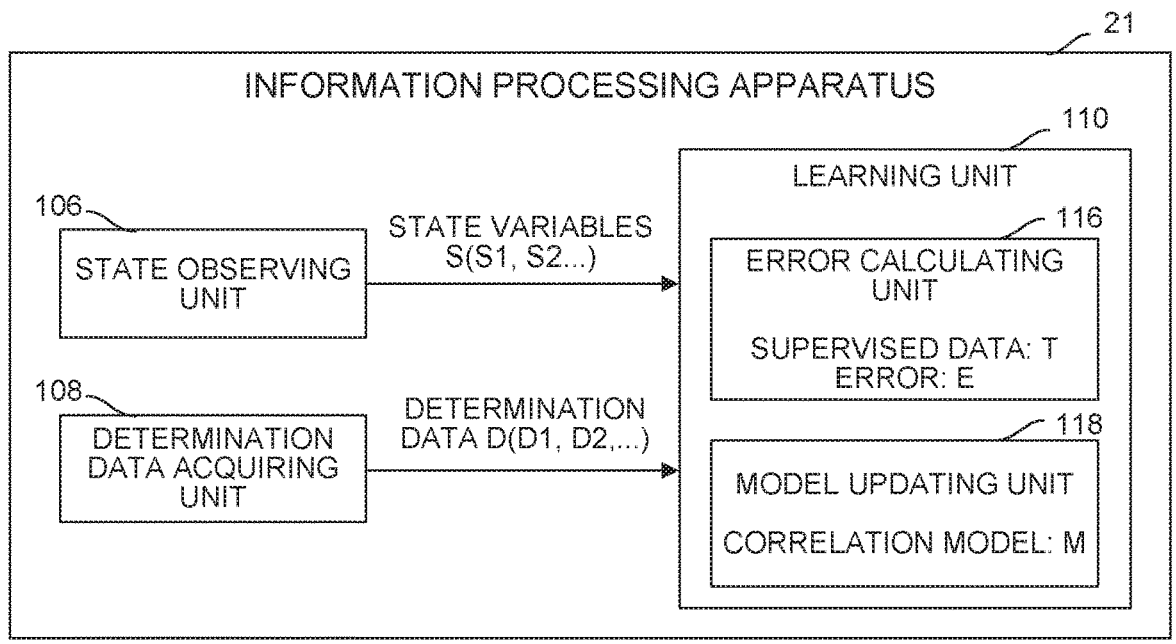
FIG. 6 is a schematic functional block diagram of an information processing apparatus according to another embodiment.

FIG. 6 shows information processing apparatus 21 of a different mode as that shown in FIG. 3, in which the information processing apparatus 21 is configured to include the learning unit 110 which executes supervised learning as another example of the learning algorithm.

Unlike reinforcement learning in which learning is started in a state where the relationship between input and output is unknown, supervised learning is a method involving providing, in advance, a large amount of known data sets (referred to as supervised data) of inputs and corresponding outputs, and by identifying a feature that implies a correlation between an input and an output from the supervised data, a correlation model (in the information processing apparatus 21 shown in FIG. 6, a correspondence relationship between the removal efficiency of chips and the discharge condition) for estimating a required output relative to a new input is learned.

In the information processing apparatus 21 shown in FIG. 6, the learning unit 110 is provided with an error calculating unit 116 and a model updating unit 118. The error calculating unit 116 calculates an error E between a correlation model M for guiding a discharge condition corresponding to a removal efficiency of chips from the state variable S and the determination data D and a correlation feature identified from supervised data T prepared in advance. And the model updating unit 118 updates the correlation model M so as to reduce the error E. The learning unit 110 learns the correspondence relationship between the removal efficiency of chips and the discharge condition as the model updating unit 118 repetitively updates the correlation model M.

An initial value of the correlation model M is, for example, expressed (for example, by a linear function) by simplifying the correlation between the removal efficiency of chips and the discharge condition, and is supplied to the learning unit 110 before the start of supervised learning. The supervised data T can be constituted by, for example, a performance value (a known data set of the removal efficiency of chips and the discharge condition) acquired in a previous removal operation of chips, and is supplied to the learning unit 110 before the start of supervised learning. The error calculating unit 116 identifies a correlation feature implying a correlation between the removal efficiency of chips and the discharge condition from the large amount of supervised data T supplied to the learning unit 110, and obtains an error E between the correlation feature and a correlation model M corresponding to the state variable S and the determination data D in the current state. The model updating unit 118 updates the correlation model M in a direction in which the error E decreases in accordance with, for example, an update rule determined in advance.

In a next learning cycle, using the state variable S and the determination data D which have changed by attempting removal of chips in accordance with the correlation model M after the update, the error calculating unit 116 obtains the error E with respect to the correlation model M corresponding to the changed state variable S and determination data D, and the model updating unit 118 once again updates the correlation model M. In this manner, the previously-unknown correlation between the current state of the environment (the removal efficiency of chips) and an action (determination of a discharge condition) corresponding thereto becomes gradually apparent. In other words, by updating the correlation model M, a relationship between the removal efficiency of chips and the discharge condition is gradually approximated to the optimal solution.

Alternatively, the information processing apparatus 21 may be configured such that the learning unit 110 executes supervised learning in an initial stage of learning and, once learning has advance by a certain degree, the learning unit 110 executes reinforcement learning by using, as an initial value, a discharge condition corresponding to the removal efficiency of chips obtained by the supervised learning. In this case, since the initial value in reinforcement learning has a certain degree of reliability, the optimal solution can be reached relatively quickly.

Figure 7A:
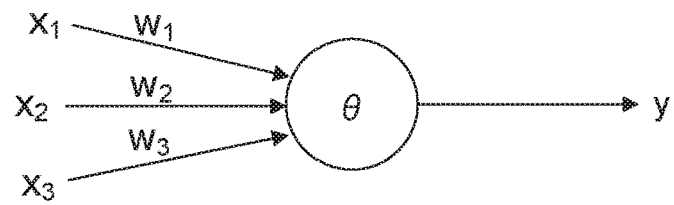
FIG. 7A is a diagram for explaining a neuron.
Figure 7B:
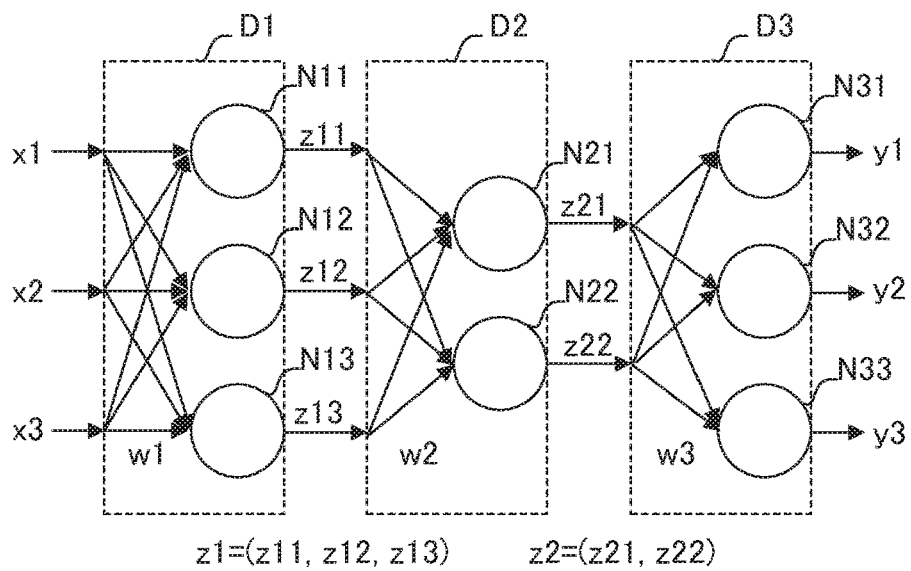
FIG. 7B is a diagram for explaining a neural network.

When advancing the reinforcement learning and the supervised learning described earlier, for example, a neural network can be used instead of Q-learning. FIG. 7A schematically shows a model of a neuron. FIG. 7B schematically shows a model of a three-layer neural network constructed by combining the neurons shown in FIG. 7A. The neural network can be constituted by, for example, a computing apparatus, a storage apparatus, and the like simulating a model of a neuron.

The neuron shown in FIG. 7A outputs results y with respect to a plurality of inputs x (in this case, as an example, input $x_1$ to input $x_3$). Each of the inputs $x_1$ to $x_3$ is multiplied by a weight w ($w_1$ to $w_3$) corresponding to the input x. Accordingly, the neuron outputs the result y expressed by expression (2) below. Note that, expression (2), the input x, the result y, and the weight w are all vectors. In addition, θ denotes a bias and $f_k$ denotes an activation function.

$$y = f_k(\Sigma_{i=1}^{n} x_i w_i - \theta) \qquad (2)$$

With the three-layer neural network shown in FIG. 7B, a plurality of inputs x (in this case, as an example, input x1 to input x3) are input from a left side and results y (in this case, as an example, a result y1 to result y3) are output from a right side. In the illustrated example, the respective inputs x1, x2, and x3 are multiplied by corresponding weights (collectively represented by w1), and each of the inputs x1, x2, and x3 is input to three neurons N11, N12, and N13.

In FIG. 7B, outputs of the respective neurons N11 to N13 are collectively represented by z1. z1 can be considered a feature vector obtained by extracting a feature quantity of an input vector. In the illustrated example, the respective feature vectors z1 are multiplied by corresponding weights (collectively represented by w2), and each of the feature vectors z1 is input to two neurons N21 and N22. The feature vectors z1 represent a feature between the weight w1 and the weight w2.

In FIG. 7B, outputs of the respective neurons N21 and N22 are collectively represented by z2. z2 can be considered a feature vector obtained by extracting a feature quantity of the feature vector z1. In the illustrated example, the respective feature vectors z2 are multiplied by corresponding weights (collectively represented by w3), and each of the feature vectors z2 is input to three neurons N31, N32, and N33. The feature vectors z2 represent a feature between the weight w2 and the weight w3. Finally, the neurons N31 to N33 respectively output results y1 to y3.

It should be noted that a method of so-called deep learning using a neural network having three or more layers can also be used.

In the information processing apparatus 21, by having the learning unit 110 perform a calculation with a multilayered structure in accordance with the neural network described above using the state variable S and the determination data D as an input x, a discharge condition (a result y) can be output. In addition, in the information processing apparatus 21, by having the learning unit 110 use a neural network as a value function in reinforcement learning and perform a calculation with a multilayered structure in accordance with the neural network described above using the state variable S and an action a as an input x, a value of the action in a certain state (a result y) can be output. Operating modes of a neural network include a learning mode and a value prediction mode and, for example, a weight w can be learned using a learning data set in the learning mode and value determination of an action can be performed in the value prediction mode using the learned weight w. Detection, classification, inference, and the like can also be performed in the value prediction mode.

The configuration of the information processing apparatus 21 described above can be described as a machine learning method (or software) executed by the processor (the CPU 11). This machine learning method is a machine learning method for learning a discharge condition and includes steps performed by a CPU of a computer of: observing the removal efficiency S1 of chips as a state variable S representing a current state of an environment in which a robot is to be controlled; acquiring determination data D indicating a propriety determination result of a removal efficiency of chips in accordance with an adjusted discharge condition; and learning a removal efficiency of chips and a discharge condition in association with each other using the state variable S and the determination data D.

Figure 8:
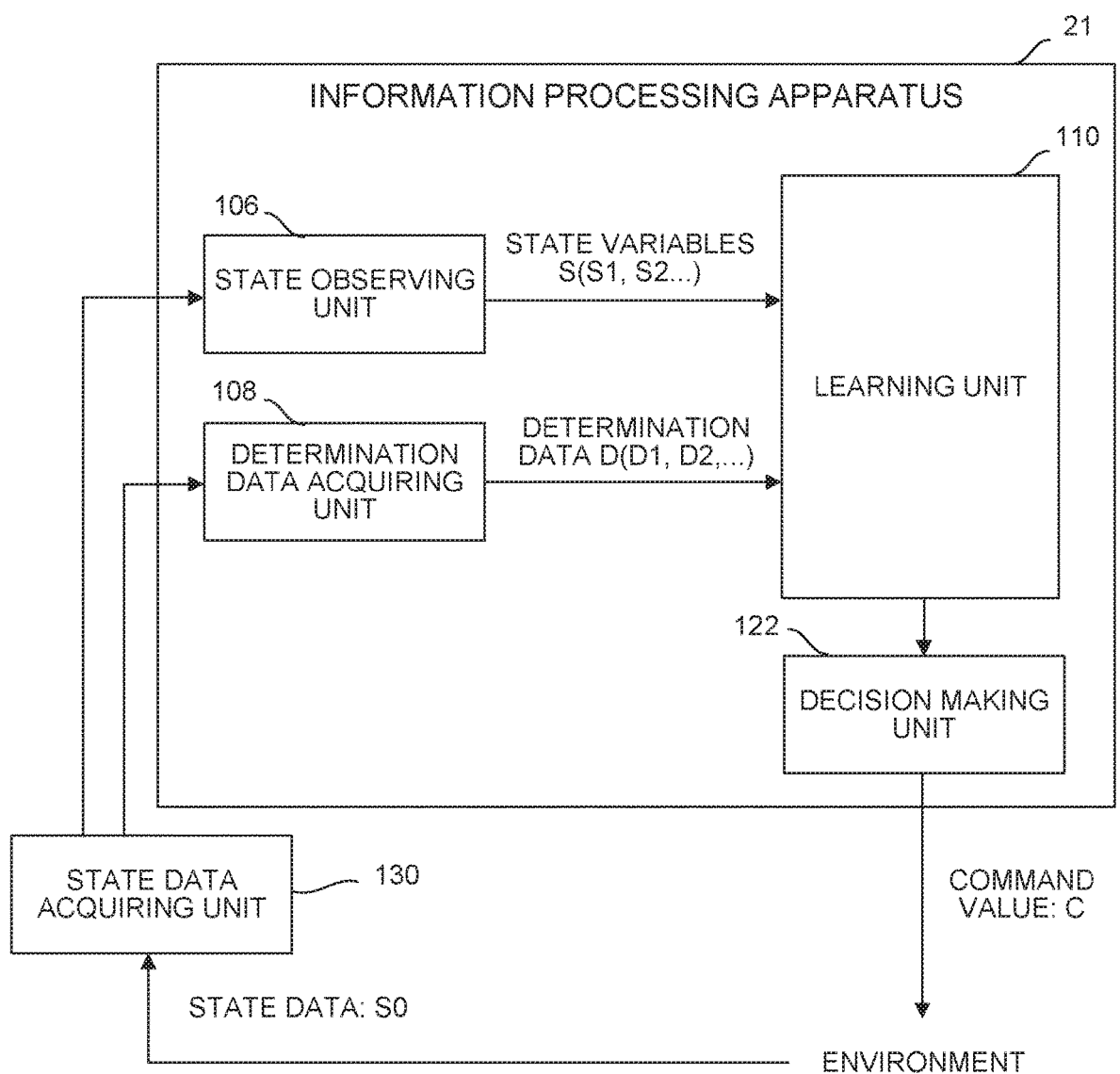
FIG. 8 is a schematic functional block diagram of an information processing apparatus according to yet another embodiment.

FIG. 8 shows an information processing apparatus 21 according to a second embodiment.

The information processing apparatus 21 acquires the removal efficiency S1 of chips in the state variables S observed by the state observing unit 106, as state data S0, from a state data acquiring unit 130. The state data acquiring unit 130 is capable of acquiring the state data S0 from the respective units of the machine tool 1, various sensors provided in the robot 2, appropriate data input by an operator, and the like.

In addition to software (such as a learning algorithm) and hardware (a processor (the CPU 11) or the like) for learning a discharge condition by machine learning, the information processing apparatus 21 includes software (such as an arithmetic algorithm) and hardware (a processor (the CPU 11) or the like) for outputting the discharge condition obtained based on a learning result as a command to the robot 2.

For example, a decision making unit 122 may be configured as a function of the processor (the CPU 11) or may be configured as software which is stored in the ROM 12 and which enables the processor (the CPU 11) to function. The decision making unit 122 generates a command value C including a command for determining a discharge condition, with respect to a removal efficiency of chips, based on a result learned by the learning unit 110, and output the generated command value C. When the decision making unit 122 outputs the command value C to the robot 2, a state of the environment changes accordingly.

The state observing unit 106 observes, in a next learning cycle, the state variable S which has changed after the command value C to the environment is output by the decision making unit 122. The learning unit 110 learns the discharge condition (in the case of reinforcement learning) by, for example, updating the value function Q (in other words, the action value table) using the changed state variable S.

The decision making unit 122 outputs the command value C which commands the discharge condition obtained based on the learning result to the robot 2. By repeating this learning cycle, the information processing apparatus 21 advances learning of the discharge condition and gradually improves reliability of the discharge condition.

The information processing apparatus 21 configured as described above produces a similar effect to the information processing apparatus 21 according to the first embodiment (FIG. 3). In particular, the information processing apparatus 21 according to the second embodiment shown in FIG. 8 is capable of changing a state of the environment by an output of the decision making unit 122. On the other hand, with the information processing apparatus 21 according to the first embodiment, a function corresponding to the decision making unit for reflecting a learning result of the learning unit 110 to the environment can be obtained from an external apparatus.

Figure 9:
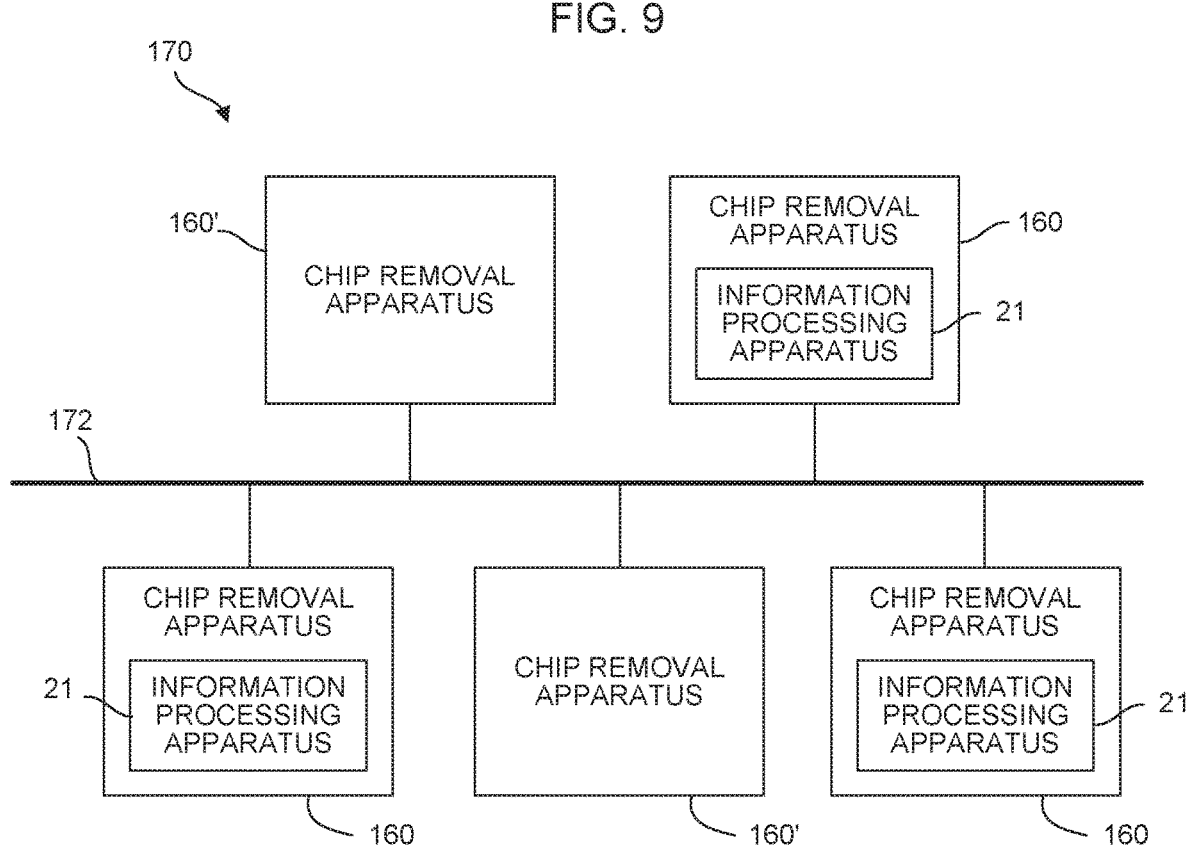
FIG. 9 is a schematic functional block diagram showing an aspect of a chip removal system incorporating a chip removal apparatus.

FIG. 9 shows a chip removal system 170 provided with a plurality of chip removal apparatuses 160.

The chip removal system 170 is provided with a plurality of chip removal apparatuses 160 and 160' which at least perform a same operation and a wired/wireless network 172 which connects the chip removal apparatuses 160 and 160' with each other, and at least one of the plurality of chip removal apparatuses 160 is configured as a chip removal apparatus 160 provided with the information processing apparatus 21 described above. In addition, the chip removal system 170 is capable of including the chip removal apparatus 160' not provided with the information processing apparatus 21. The chip removal apparatuses 160 and 160' have a mechanism required by operations with a same objective.

In the chip removal system 170 configured as described above, the chip removal apparatus 160 provided with the information processing apparatus 21 among the plurality of chip removal apparatuses 160 and 160' is capable of using a learning result of the learning unit 110 to automatically and accurately obtain a discharge condition corresponding to a desired removal efficiency of chips without having to rely on calculations and estimations. In addition, a configuration can be adopted in which the information processing apparatus 21 of at least one chip removal apparatus 160 learns a discharge condition common to all of the chip removal apparatuses 160 and 160' based on the state variable S and the determination data D obtained for each of the other plurality of chip removal apparatuses 160 and 160', and a learning result thereof is shared by all of the chip removal apparatuses 160 and 160'. Therefore, according to the chip removal system 170, a speed and reliability of learning of a discharge condition can be improved by using a data set (including the state variable S and the determination data D) with greater variation as input.

Figure 10:
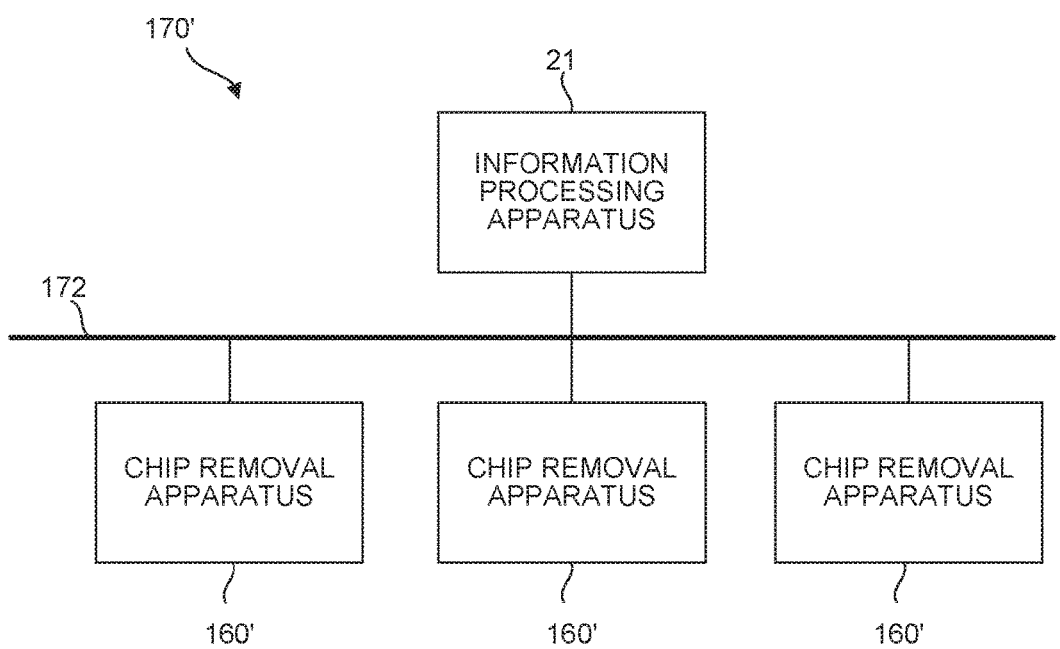
FIG. 10 is a schematic functional block diagram showing an aspect of a chip removal system incorporating a chip removal apparatus.

FIG. 10 shows a chip removal system 170' according to another embodiment provided with a chip removal apparatus 160'.

The chip removal system 170' is provided with the information processing apparatus 21, a plurality of chip removal apparatuses 160' having a same mechanical configuration, and a wired/wireless network 172 which connects the chip removal apparatuses 160' and the information processing apparatus 21 with each other.

In the chip removal system 170' configured as described above, the information processing apparatus 21 is capable of learning a discharge condition with respect to a removal efficiency of chips common to all chip removal apparatuses 160' based on the state variable S and the determination data D obtained for each of the plurality of chip removal apparatuses 160', and using a learning result thereof to automatically and accurately obtain the discharge condition with respect to the removal efficiency of chips without having to rely on calculations and estimations.

The chip removal system 170' can be configured such that the information processing apparatus 21 exists in a cloud server or the like prepared on the network 172. According to this configuration, regardless of a position or a period of time of existence of each of the plurality of chip removal apparatuses 160', a necessary number of chip removal apparatuses 160' can be connected to the information processing apparatus 21 at a necessary time.

An operator working on the chip removal system 170 shown in FIG. 9 or the chip removal system 170' shown in FIG. 10 can determine, at an appropriate time after the start of learning by the information processing apparatus 21, whether or not an achievement level of learning of a discharge condition (reliability of a discharge amount) by the information processing apparatus 21 has reached a required level.

While embodiments of the present invention have been described above, it is to be understood that the present invention is not limited to the examples presented in the embodiments and maybe variously embodied by making suitable modifications thereto.

For example, the learning algorithm, the arithmetic algorithm, the control algorithm, and the like executed by the information processing apparatus 21 are not limited to those described above and various algorithms can be adopted.

In addition, for example, the information processing apparatus 21 may be configured such that information describing which areas are to be cleaned in what order can be input and output as the state variable S. For example, a machining space inside the machine tool is divided into areas (sections). In addition, for each section, the state variables S1, S2, . . . described above, a label, and an ordinal number (when there are a total of nine sections, any one of section 1 to section 9) indicating a cleaning order are input to a learning instrument. Accordingly, for example, a cleaning order for realizing a desired removal efficiency of chips can be learned.

The invention claimed is:

1. An information processing apparatus which determines a discharge condition indicating values of air or fluid discharged by a chip removal apparatus in order to remove chips, the information processing apparatus comprising:
a processor configured to:
observe data indicating a removal efficiency of the chips, obtained when performing prescribed chip removal operation under a prescribed discharge condition indicating prescribed values of the air or the fluid discharged by the chip removal apparatus, as a state variable representing a current state of an environment;
acquire determination data indicating a propriety determination result of the removal efficiency of the chips; and
learn a correlation between the adjustment of the discharge condition and the removal efficiency of the chips using the state variable and the determination data, by:
obtaining a reward related to the propriety determination result; and
updating, using the reward, a function representing a value of the discharge condition with respect to the removal efficiency of the chips,
wherein the processor learns the value of an action of adjustment of the discharge condition that is made when the removal efficiency of chips is observed so as to learn a correlation between the adjustment of the discharge condition and the removal efficiency of chips.

2. The information processing apparatus according to claim 1, wherein the processor is further configured to output, based on a learning result, a command value based on the discharge condition.

3. The information processing apparatus according to claim 1, wherein the information processing apparatus exists on a cloud server.

4. The information processing apparatus according to claim 1, wherein
the processor is further configured to calculate the state variable and the determination data in a multilayered structure.

5. The information processing apparatus according to claim 1, wherein
the processor is further configured to learn the discharge condition using the state variable and the determination data obtained for each of a plurality of the chip removal apparatuses.

6. A chip removal apparatus which discharges an object in order to remove chips, the chip removal apparatus comprising:
an information processing apparatus which determines a discharge condition indicating values of air or fluid discharged by the chip removal apparatus, wherein
the information processing apparatus includes a processor configured to:
observe data indicating a removal efficiency of the chips, obtained when performing prescribed chip removal operation under a prescribed discharge condition indicating prescribed values of the air or the fluid discharged by the chip removal apparatus, as a state variable representing a current state of an environment;
acquire determination data indicating a propriety determination result of the removal efficiency of the chips; and
learn a correlation between the adjustment of the discharge condition and the removal efficiency of the chips using the state variable and the determination data, by:
obtaining a reward related to the propriety determination results; and
updating, using the reward, a function representing a value of the discharge condition with respect to the removal efficiency of the chips, and wherein
the processor learns the value of an action of adjustment of the discharge condition that is made when the removal efficiency of chips is observed so as to learn a correlation between the adjustment of the discharge condition and the removal efficiency of chips.

* * * * *